US009249858B2

(12) United States Patent
Preikszas

(10) Patent No.: US 9,249,858 B2
(45) Date of Patent: Feb. 2, 2016

(54) HYDRAULIC ENGINE MOUNT INERTIA TRACK WITH MULTIPLE RESTRICTIONS

(71) Applicant: Trelleborg Automotive USA, Inc., South Haven, MI (US)

(72) Inventor: Otto John Preikszas, Holland, MI (US)

(73) Assignee: Trelleborg Automotive USA, Inc., South Haven, MI (US)

( * ) Notice: Subject to any disclaimer, the term of this patent is extended or adjusted under 35 U.S.C. 154(b) by 0 days.

(21) Appl. No.: 14/269,661

(22) Filed: May 5, 2014

(65) Prior Publication Data

US 2014/0327198 A1 Nov. 6, 2014

Related U.S. Application Data

(60) Provisional application No. 61/819,263, filed on May 3, 2013.

(51) Int. Cl.
*F16F 13/10* (2006.01)
(52) U.S. Cl.
CPC ............. *F16F 13/107* (2013.01); *F16F 13/105* (2013.01)
(58) Field of Classification Search
CPC .. F16D 13/105; F16D 13/107; F16D 13/1463
See application file for complete search history.

(56) References Cited

U.S. PATENT DOCUMENTS

| 4,836,515 | A | | 6/1989 | Franz et al. | |
|---|---|---|---|---|---|
| 4,921,232 | A | | 5/1990 | Hofmann | |
| 5,118,087 | A | | 6/1992 | Jordens et al. | |
| 5,702,094 | A | * | 12/1997 | McLelland et al. | 267/140.12 |
| 6,308,942 | B1 | | 10/2001 | Ersoy et al. | |
| 6,666,437 | B2 | * | 12/2003 | Larmande et al. | 267/141.2 |

FOREIGN PATENT DOCUMENTS

EP 0995927 A2 4/2000

* cited by examiner

*Primary Examiner* — Anna Momper
(74) *Attorney, Agent, or Firm* — Dinsmore & Shohl LLP

(57) ABSTRACT

A hydraulic engine mount is provided having at least one channel provided within the engine mount. The channel is provided fully enclosed within the engine mount. The channel includes at least two restrictions operable to partially restrict fluid flow through the channel thereby preventing unwanted noise heard by the user. The at least two restrictions include at least one protrusion extending away from a side wall of the channel. Two protrusions are provided to form each restriction where the protrusions are opposed and spaced apart extending into the channel. The at least one protrusion includes at least one sloped wall. The at least one sloped wall is disposed upstream of the fluid through the channel and may be positioned adjacent to an inlet or an outlet of the channel.

14 Claims, 5 Drawing Sheets

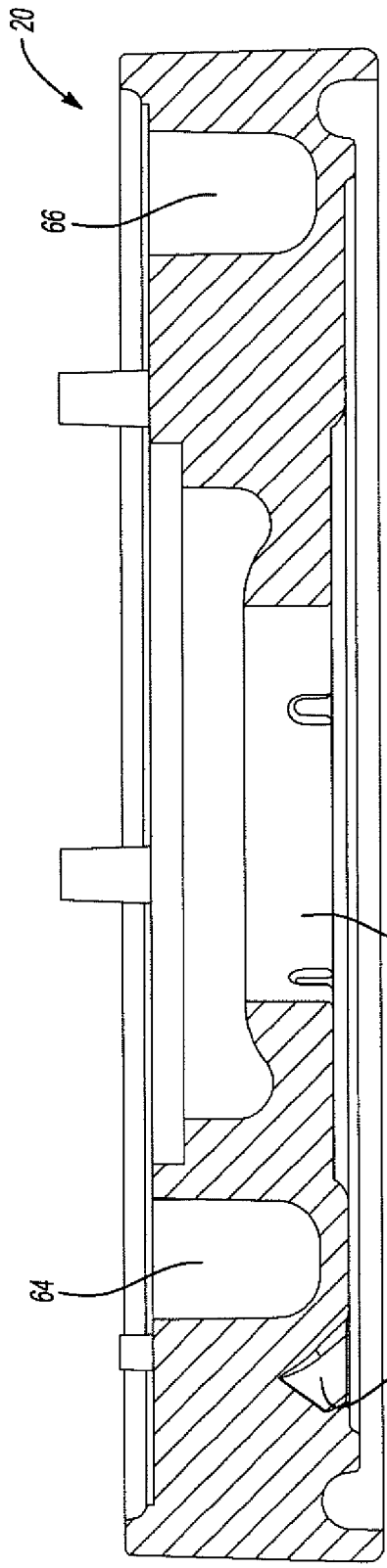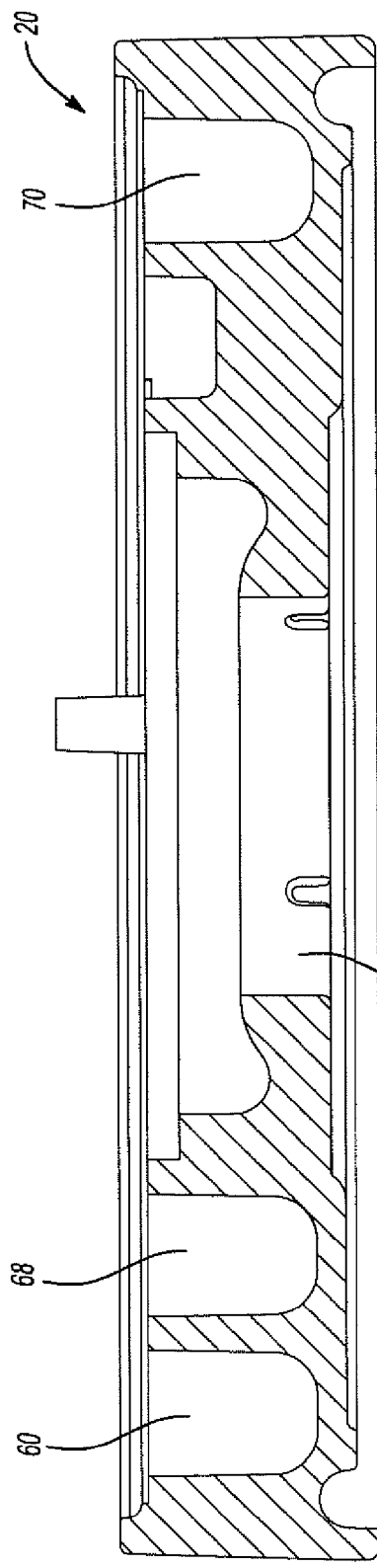

HYDRAULIC ENGINE MOUNT INERTIA TRACK WITH MULTIPLE RESTRICTIONS

CROSS-REFERENCE TO RELATED APPLICATIONS

This application claims priority of U.S. Provisional Patent Application Ser. No. 61/819,263 filed May 3, 2013, incorporated herein by reference.

FIELD OF THE INVENTION

The present invention relates generally to engine mounts. More particularly, the present invention relates to a hydraulic engine mount having an inertia track.

BACKGROUND OF THE INVENTION

It is common for hydraulic engine mounts to have an inertia track assembly having an upper inertia track and a lower inertia track. The hydraulic engine mount assembly having an inertia track assembly often includes an elastomeric disc (decoupler) captured between the upper and lower inertia tracks (See FIG. 7 illustrating the prior art). The inertia track is a channel filled with a hydraulic fluid moving between the upper and lower chambers of the hydraulic mount. The inertia track is unobstructed throughout the entire length of the track to offer the most efficient movement of fluid within the track as it enters and exits the track.

However, a common problem with a fluid filled engine mount inertia track is that the decoupler disc creates noise caused by the contact between the disc and the inertia track pieces. The contact of the disc also produces a force which is transferred through the mount to the attaching vehicle structure which can cause vibration and/or noise in the vehicle and heard by the user. Accordingly, there exists a need in the art to provide a hydraulic engine mount having a fluid filled inertia track with decreased vibration and noise.

SUMMARY OF THE INVENTION

A hydraulic engine mount is provided having at least one channel provided within the engine mount. The channel is provided fully enclosed within the engine mount. The channel includes at least two restrictions-operable to partially restrict fluid flow through the channel thereby reducing pressure and mitigating unwanted noise heard by the user. The at least two restrictions each include at least one protrusion extending away from a side wall of the channel. Two protrusions are provided forming the restriction where the protrusions are opposed and spaced apart extending into the channel. The at least one protrusion includes at least one sloped wall. The at least one sloped wall is disposed upstream of the fluid through the channel and may be positioned adjacent to an inlet or an outlet of the channel. (Not sure what is trying to be said here)

A hydraulic engine mount is provided having a base portion and a channel extending through the base portion of the engine mount. The channel is adapted to allow fluid to flow through the engine mount. At least two restrictions disposed within the channel thereby restricting fluid flow through the channel. The at least two restrictions includes at least one protrusion extending away from a side wall of the channel. In one embodiment, the hydraulic engine mount of claim 1 wherein the at least one protrusion include two total protrusions being opposed and spaced apart extending into the channel. The at least one protrusion includes at least one sloped wall. The at least one sloped wall is disposed upstream of the fluid through the channel.

A hydraulic engine mount including a channel where the channel has a first side wall and a second side wall, the second side wall being opposed and spaced apart from the first side wall. The restrictions are disposed within the channel, the restrictions having a first protrusion on the first side wall of the channel, a second protrusion provided opposed and spaced apart from the first protrusion thereby restricting fluid flow through the channel. The first protrusion and the second protrusion each have a sloped surface. In one embodiment, the restriction is disposed adjacent to an inlet within the channel. In yet another embodiment, the restriction is disposed adjacent to an outlet within the channel.

BRIEF DESCRIPTION OF THE DRAWINGS

FIG. 5 illustrates a cross-sectional view of the inertia track along the line 5-5 of FIG. 4;

FIG. 6 illustrates a cross sectional view of the inertia track along the 6-6 of FIG. 4.

DETAILED DESCRIPTION OF THE INVENTION

The present invention provides for a hydraulic engine mount for dampening having an inertia track having multiple restrictions or pinch points. The inner surface of the inertia track is modified to create multiple points of restriction to alter the hydraulic fluid flow through the inertia track. The inclusion of two or more restriction points within the inertia track substantially decreases the pressure of the fluid and noise as heard by the user of the vehicle. The restriction points added to the inside of the inertia track influence the flow of fluid through the track such that energy is absorbed into the restriction points to reduce the transmitted force through the mount. The restriction points within the inertia track are generally triangle shaped or curved features protruding inward to the center of the inertia track from either side or surface of the inertia track thereby locally restricting the effective cross section for the fluid to pass through. The restriction points are positioned near the inlet and outlet features of the inertia track.

Figure 1:
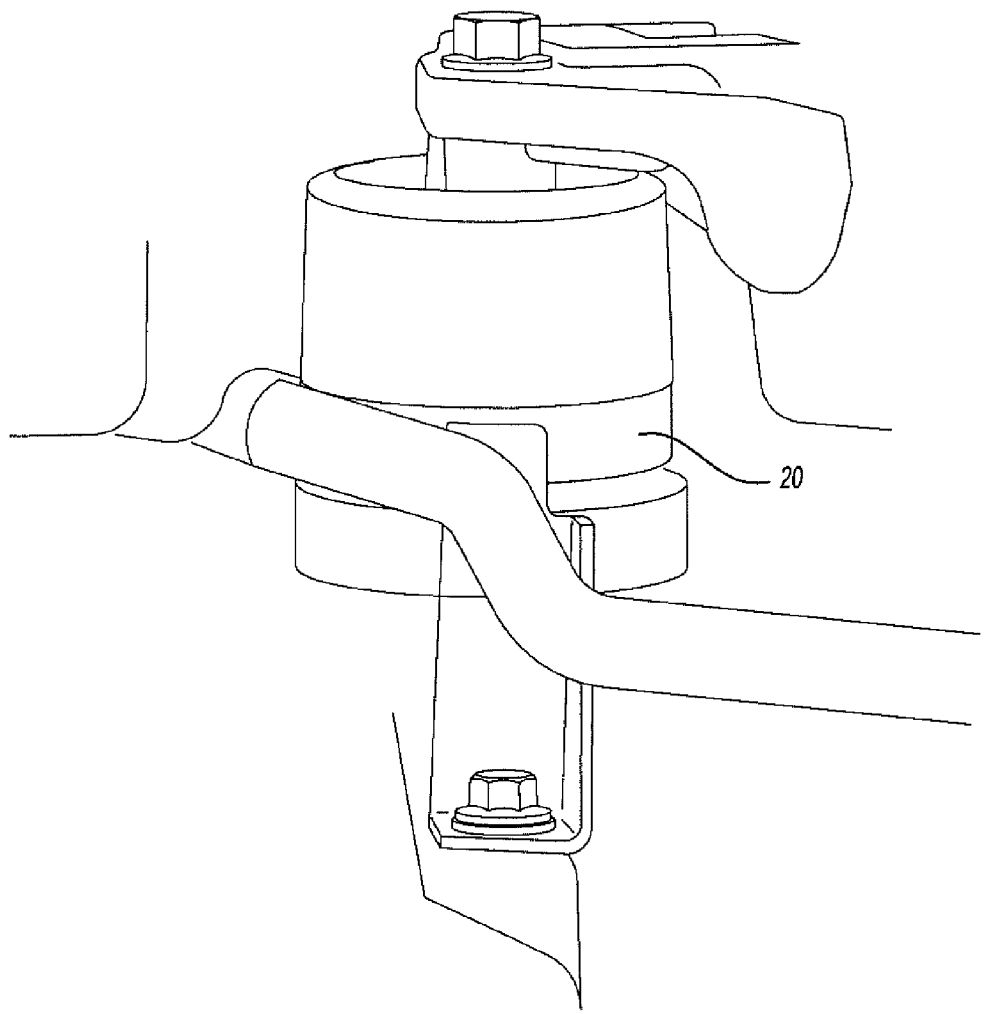
FIG. 1 illustrates a perspective view of an installed engine mount of the present invention.

FIG. 1 illustrates the partial mount 20 having an inertia track (or channel). The mount and inertia track include an inlet allowing fluid to enter the inertia track 12 and an outlet 18 to transport fluid from a first chamber to a second chamber. The mount 10 further includes an outer surface 16 which may be housed in a separate housing. The inertia track 12 of the prior art includes a smooth inner surface without having any obstructions or restrictions. The cross-sectional dimensions of the inertia track 12 remain relatively consistent from the inlet 14 to the outlet 18.

Figure 2:
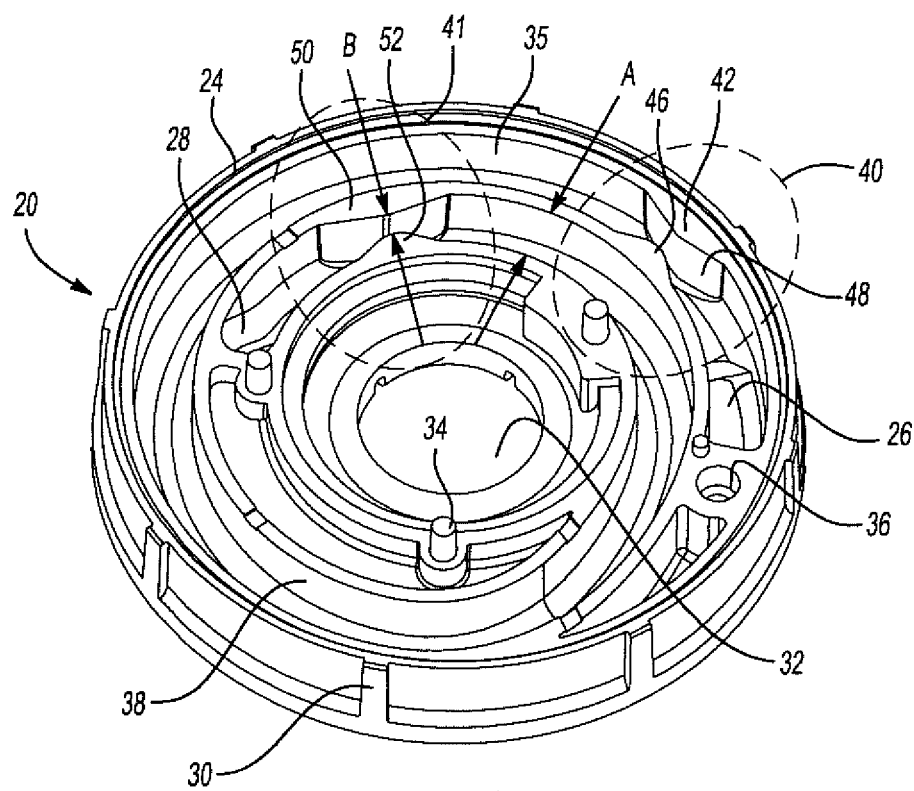
FIG. 2 illustrates a perspective view of the inertia track having restriction points of the present invention.
Figure 3:
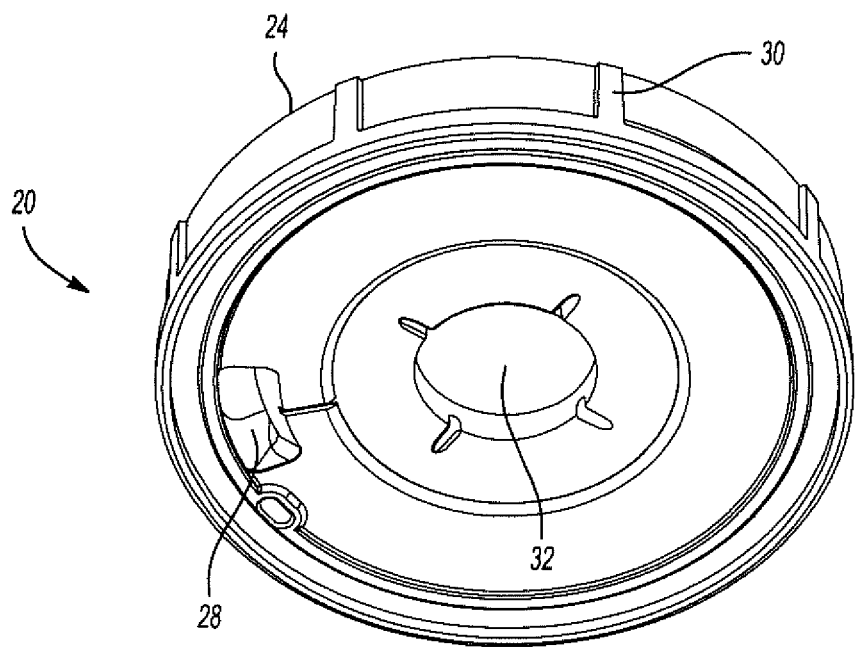
FIG. 3 illustrates a perspective bottom view of the inertia track of the present invention.
Figure 4:
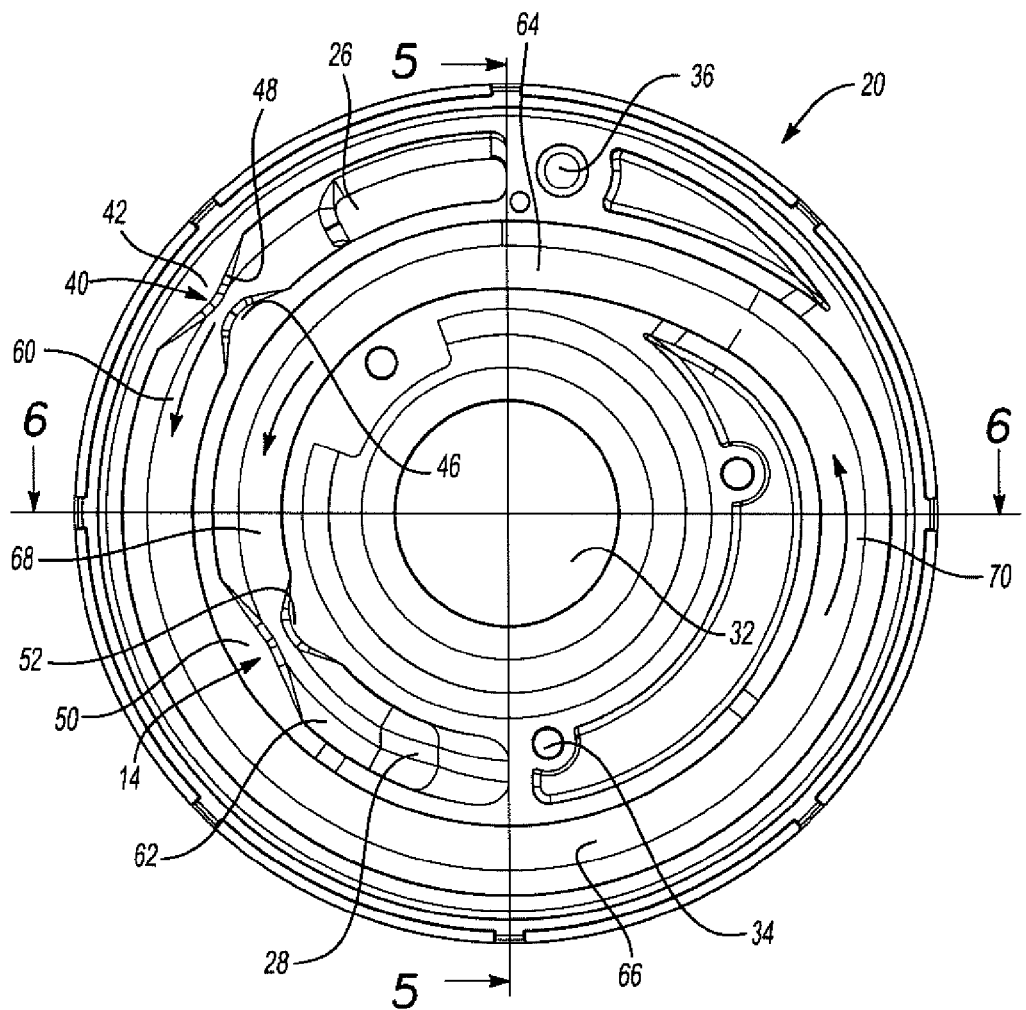
FIG. 4 illustrates a top view of the inertia track of the present invention.
Figure 7:
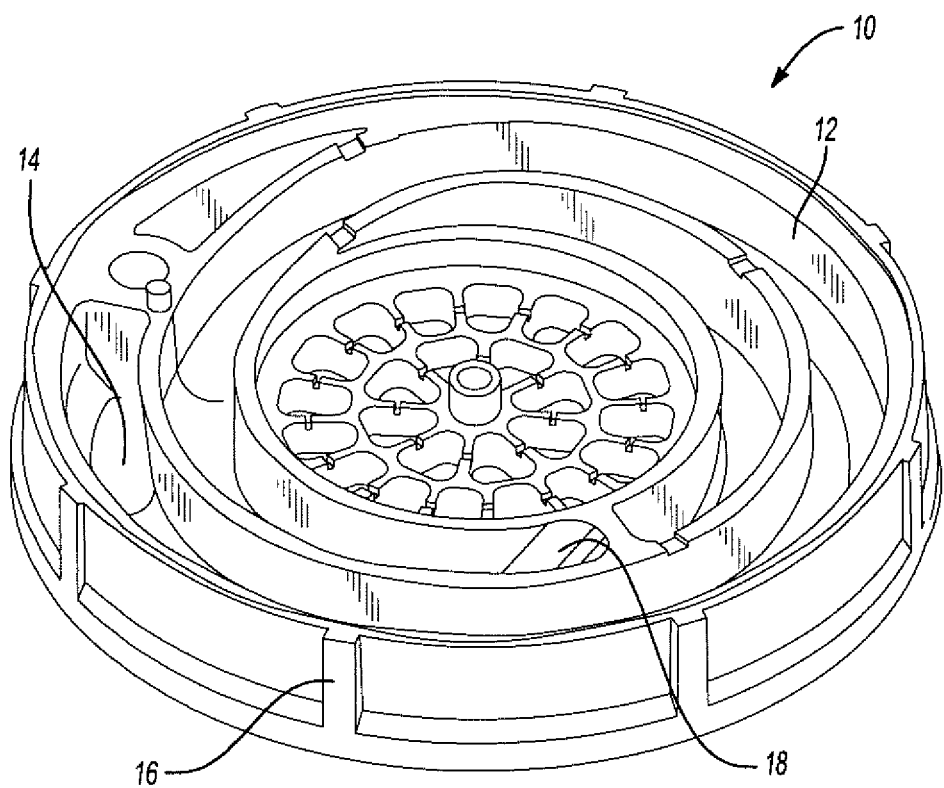
FIG. 7 illustrates an inertia track of the prior art without any restrictions.

FIGS. 2-4 illustrate the partial mount 20 having an inertia track (or channel) 22 of the present invention. The mount 20 includes an upper surface 24 which may also be a seal. The inertia track 20 includes an inlet 26 and an outlet 28. The inlet 26 is operable to receive fluid from a first chamber. The fluid then flows through the inertia track 22 and out through the outlet 28 to a second chamber.

The mount 20 includes an outer surface 30 and an inner rubber portion (not pictured). Various attachment features and apertures 34, 36 are provided to connect and align the various components of the full engine mount to one another.

The inertia track 22 includes a first surface 35 and a second surface 38. The first surface 35 is the outermost surface of the inertia track 22. The second surface 38 is the innermost surface of the inertia track 22.

In the present embodiment, the inertia track 22 assembly as shown in FIG. 2 is made of plastic, aluminum or other suitable material. In alternative embodiments, the assembly is made of a plastic, polymer, plastic like, rubber, or polymer like material suitable for use in the engine mount.

The inertia track 22 includes the first surface 35 and the second surface 38. Various protrusions are included on both the first surface 35 and on the second surface 38 to create two restriction points 40, 41. The first restriction point 40 is positioned near the inlet 26 of the inertia track 22. The positioning of the restriction point 40 near the inlet 26 greatly reduces the overall pressure and thus noise of the engine mount.

A second restriction point 41 is positioned at a point later down the inertia track 22 near the outlet 28 of the inertia track 20. The second restriction point 42 also reduces the overall fluid pressure and thus noise of the engine mount. The inclusion of the two restriction points 40, 41 dramatically reduces the overall noise of the engine mount. Testing has shown a significant drop in noise with the inclusion of at least two restriction points.

The first restriction point 40 includes a first protrusion 42 and a second protrusion 46. The first protrusion 42 as compared to the second protrusion 46 may vary in dimension and size. In the present embodiment, the first protrusion 42 has a generally triangular shape having generally planar surfaces 48. Conversely, the second protrusion 46 includes a generally curved surface protruding to the center of the inertia track 22. These configurations may be reversed or duplicated according to the requirements of the vehicle.

The second restriction point 41 includes a first protrusion 50 and a second protrusion 52. In accordance with the arrangement of the first restriction point 40, the first protrusion 50 includes a generally triangular shaped protrusion extending into the center of the inertia track 22. The second protrusion 52 is curved and with a rounded point extends into the inertia track 22. The first protrusion 50 includes generally planar surfaces 54 to create a generally triangular shape.

The restriction points 40, 41 change the geometry of the inertia track 22. Specifically, the restriction points 40, 41 decrease the distance between the first surface 35 and the second surface 38. Throughout most of the length of the inertia track 22 the inertia track 22 includes a spaced apart distance A between the first surface 35 and the second surface 38. The distance A throughout the inertia track 22 is generally constant with the exception of a few points near the inlet 26 and the outlet 28 of the inertia track. At the restriction points 40, 41, the distance between the first surface 35 and the second surface 38 of the inertia track 22 is at a predetermined distance B. The distance B is the smallest point, thus being a restriction point, of the inertia track 22.

The protrusions 42, 46, 50, 52 gradually decrease the distance between the first surface 35 and the second surface 38 until the distance between the first surface 35 and the second surface 38 is at a minimum at the distance B. This restriction point locally restricts the effective cross section for the fluid to pass through the inertia track 22. These restriction points 40, 41 significantly reduce noise by influencing the flow of fluid through the inertia track 22 such that energy is absorbed into the restriction points 40, 41 thereby reducing the transmitted forces throughout the engine mount. As such, at least two restriction points are required to reduce the noise level of the engine mount.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art.

The invention claimed is:

1. A hydraulic engine mount having hydraulic fluid comprising:
  at least one channel provided within the engine mount, the channel fully enclosed within the engine mount, the channel having a pair of spaced apart sidewalls thereby defining a cavity;
  the channel having at least two restrictions operable to partially reduce fluid flow through the channel, each sidewall having one restriction of the at least two restrictions thereby reducing noise heard by the user.

2. The hydraulic engine mount of claim 1 wherein the at least two restrictions each include at least one protrusion extending away from a side wall of the channel.

3. The hydraulic engine mount of claim 2 wherein the at least two restrictions each have two total protrusions being opposed and spaced apart extending into the channel.

4. The hydraulic engine mount of claim 2 wherein the at least one protrusion includes at least one sloped wall.

5. The hydraulic engine mount of claim 4 wherein the at least one sloped wall is disposed upstream of the fluid from the inlet of the channel.

6. The hydraulic engine mount of claim 1 wherein the at least two restrictions each include at least one protrusion extending away from a side wall of the channel.

7. The hydraulic engine mount of claim 6 wherein the at least one protrusion include two total protrusions for each restriction being opposed and spaced apart extending into the channel.

8. The hydraulic engine mount of claim 6 wherein the at least one protrusion includes at least one sloped wall.

9. The hydraulic engine mount of claim 8 wherein the at least one sloped wall is disposed upstream of the fluid from the inlet of the channel.

10. A hydraulic engine mount having hydraulic fluid comprising:
  a base portion;
  a channel extending through the base portion of the engine mount, the channel adapted to allow fluid to flow through the engine mount, the channel having a pair of spaced apart sidewalls thereby defining a cavity;
  at least two restrictions disposed within the channel, each sidewall having one restriction of the at least two restrictions, the at least two restrictions extending into the at least one channel thereby reducing fluid flow through the channel.

11. A hydraulic engine mount having hydraulic fluid comprising:
  a channel, the channel having a first side wall and a second side wall, the second side wall being opposed and spaced apart from the first side wall;
  a pair of restrictions disposed within the channel, the restrictions each having a first protrusion on the first side wall of the channel, the restrictions each having a second protrusion provided opposed and spaced apart from the first protrusion thereby reducing fluid flow through the channel to reduce pressure and noise within the channel.

12. The hydraulic engine mount of claim 11 wherein the first protrusion and the second protrusion each have a sloped surface.

13. The hydraulic engine mount of claim 11 wherein one restriction of the pair of restrictions is disposed adjacent to an inlet within the channel.

14. The hydraulic engine mount of claim 11 wherein one restriction of the pair of restrictions is disposed adjacent to an outlet within the channel.

* * * * *